United States Patent

Kratz

[11] Patent Number: 6,106,424
[45] Date of Patent: Aug. 22, 2000

[54] HYDRAULIC TENSION DEVICE FOR A TRACTION MECHANISM

[75] Inventor: Eduard Kratz, Höchstadt, Germany

[73] Assignee: INA Walzlager Schaeffler oHG, Herzogenaurach, Germany

[21] Appl. No.: 08/952,422

[22] PCT Filed: Feb. 14, 1996

[86] PCT No.: PCT/EP96/00634

§ 371 Date: Nov. 18, 1997

§ 102(e) Date: Nov. 18, 1997

[87] PCT Pub. No.: WO96/36823

PCT Pub. Date: Nov. 21, 1996

[30] Foreign Application Priority Data

May 18, 1995 [DE] Germany ............... 295 08 244 U

[51] Int. Cl.[7] .................................................. F16H 7/12
[52] U.S. Cl. .......................................... 474/110; 474/138
[58] Field of Search .................................. 474/110, 109, 474/135, 133, 138; 285/226; 123/90.15; 277/636; 403/50, 140, 28; 74/18, 18.1, 18.2; 200/144

[56] References Cited

U.S. PATENT DOCUMENTS

| | | | |
|---|---|---|---|
| 4,585,913 | 4/1986 | Yorita ..................................... | 200/144 |
| 4,790,801 | 12/1988 | Schmidt et al. . | |
| 4,798,563 | 1/1989 | Okabe et al. ............................ | 474/110 |
| 4,981,460 | 1/1991 | Ojima .................................... | 474/138 X |
| 4,997,410 | 3/1991 | Polster et al. ......................... | 474/138 X |
| 5,046,745 | 9/1991 | Sweetland et al. ................. | 74/18.2 X |
| 5,074,697 | 12/1991 | Blanpain et al. ........................ | 403/28 |
| 5,116,284 | 5/1992 | Cho ....................................... | 474/110 |
| 5,601,378 | 2/1997 | Fukukawa et al. .................... | 403/140 |

FOREIGN PATENT DOCUMENTS

| | | |
|---|---|---|
| 89 03 728 | 7/1989 | Germany . |
| 39 28 762 | 3/1990 | Germany . |
| 39 43316 | 7/1990 | Germany . |

*Primary Examiner*—David A. Bucci
*Assistant Examiner*—Marcus Charles
*Attorney, Agent, or Firm*—Volpe and Koenig, P.C.

[57] ABSTRACT

A hydraulic tensioner for a traction drive is provided having a spring-loaded piston (8) guided for longitudinal motion in a cylinder (6), in which tensioner, a piston motion causes an exchange of volume between a high pressure chamber (9) arranged in the cylinder (8) and a hollow space (4) which is partly filled with hydraulic medium, and, depending on a direction of motion of the piston (8), said exchange of volume can take place through a one-way valve (15), the tensioner further comprising a bellows seal (18) which is arranged between the piston (8) or the piston housing (10) at one end, and the outer housing (2) at a second end and follows the longitudinal motion of the piston (8) while bearing under pre-stress against the outer housing (2) and against the radially inward stepped piston housing (10). The bellows seal (18) of the invention is radially pre-stressed towards the piston housing (10) and/or the outer housing (2) so that, on occurrence of an overpressure in the hollow space (4), an automatic reduction of pressure of the air enclosed in the hollow space (4) can take place.

12 Claims, 3 Drawing Sheets

HYDRAULIC TENSION DEVICE FOR A TRACTION MECHANISM

FIELD OF THE INVENTION

The invention concerns a hydraulic tensioner for a traction drive, in particular for internal combustion engines, one end of the tensioner being pivotally supported while a further end is connected directly or indirectly to a tension roller. The tensioner has a spring-loaded piston guided for sliding motion in a cylinder which is arranged in an outer housing and filled with hydraulic medium to an amount corresponding to the piston position, in which tensioner a piston motion causes an exchange of volume between a high pressure chamber arranged in the cylinder and a hollow space of the outer housing which is partly filled with hydraulic medium. Depending upon a direction of motion of the piston, the exchange of volume can take place through a one-way valve arranged on the cylinder or through a leak gap. The tensioner further includes a bellows seal which is arranged between the piston or the piston housing and the outer housing and follows the longitudinal motion of the piston while bearing under pre-stress against the outer housing and against the radially inward stepped piston housing, both ends of the bellows seal having a retention bead to assure a positional fixing.

BACKGROUND OF THE INVENTION

Hydraulic tensioners are particularly used for maintaining the pre-stress for a traction drive, i.e., a belt or chain drive, as constant as possible when elongation has taken place, and to effectively damp vibrations.

A hydraulic tensioner of the generic type known from U.S. Pat. No. 4,790,801 comprises a piston slidably guided in a cylinder which is positionally fixed in an outer housing, said housing being pivoted by a fixing eye, for example, on a crankcase of an internal combustion engine. At its end turned away from the cylinder, the piston is fixed in a piston housing which engages partly into the outer housing and is connected by a fixing eye directly or indirectly to a tension roller which bears against the traction drive. A compression spring coaxially surrounding the piston and the cylinder is arranged between the outer housing and the piston housing to spring load the piston housing so as to urge it towards the tension roller. The construction of the hydraulic tensioner further permits an exchange of hydraulic fluid volume from a high pressure chamber in the cylinder as a result of piston motion. Depending on the direction of motion of the piston, hydraulic fluid can flow from the reservoir into the cylinder through a one-way valve arranged on the cylinder, or on a reversal of the piston motion, the hydraulic fluid can be displaced from the high pressure chamber into the reservoir through a leak gap situated between the piston and the inner wall of the cylinder. To seal the telescoped components, i.e. the outer housing and the piston housing which is partly slidable therein, a bellows seal is provided which bears under pre-stress against the piston housing and the outer housing, each end of the seal being positionally fixed by a retention bead which engages into a circumferential groove. The prior art bellows seal offers no possibility of reducing overpressure in the outer housing which can occur, for example, on a variation of length of the traction drive or during mounting, i.e. during belt replacement, when the piston of the tensioner is pressed to a block. The pushing-in of the piston creates an overpressure with a concomitant inflation of the bellows seal which often results in a displacement of the bellows seal, i.e. in a radial exit of the retention bead out of the circumferential groove and a subsequent axial displacement, so that an exact guidance of the bellows seal is no longer possible and the danger of destruction exists.

OBJECT OF THE INVENTION

It is therefore an object of the invention to create a hydraulic tensioner which permits a regulation of overpressure without a loss of hydraulic fluid and without giving rise to a malfunction.

SUMMARY OF THE INVENTION

The invention achieves this object by the bellows seal being radially pre-stressed towards the piston housing and/or the outer housing, and/or having means so that an overpressure developing in the hollow space causes a radial displacement of a part of the bellows seal and thus assures a free communication between the hollow space and the atmosphere for a short period of time which permits an automatic reduction of pressure of the air enclosed in the hollow space.

The invention provides a structure and an arrangement of the bellows seal which, when overpressure develops in the hollow space, allow a regulation of pressure of the air enclosed in the hollow space by a controlled radial displacement of at least a part of the bellows seal. The configuration of the bellows seal of the invention advantageously assures a regulation of overpressure, or pressure reduction, by a release of the compressed air when overpressure develops in the hollow space as a result of the retraction of the piston and the piston housing into the cylinder. This radial displacement of a part of the bellows seal as provided by the invention establishes a free communication between the hollow space of the outer housing and the outer atmosphere for a short period of time, and because the air is released under overpressure no harmful dirt particles can enter the hollow space. The quality of sealing obtained with the structure of the invention after equalization of pressure is such that no detrimental suction of air is possible upon extension of the piston and the piston housing.

In a further development of the invention, the bellows seal does not bear with its entire surface against the piston housing so that the surface of the bellows seal under load when overpressure occurs is enlarged whereby a radial expansion of this part of the seal can be simplified.

Advantageously, circumferentially spaced longitudinal grooves can be made on the inner surface of the bellows seal to increase the surface area acted upon by the pressure and, at the same time, reduce the stiffniess of this part of the bellows seal. According to the invention, the longitudinal grooves extend advantagaeously up to the annular bead of the bellows seal.

Alternatively, it is possible to make longitudinal grooves in the peripheral surface of the piston housing and have them extend up to the annular groove in the piston housing.

In a further embodiment of the invention, longitudinal grooves are provided both in the bellows seal and in the piston housing. To obtain a uniform pressure loading of the bellows seal in this case, the longitudinal grooves of the bellows seal and those of the peripheral surface of the piston housing should be differently spaced, i.e., they should be offset to each other.

The longitudinal grooves of the bellows seal, as also those of the piston housing, can have any desired configuration depending on the requirements. Thus, for example, the cross-section of the longitudinal grooves can have a semicircular, a triangular or any other geometric cross-sectional shape.

According to the invention, in the neutral position of the bellows seal, the retention bead comprises a closed radial sealing surface and an axial sealing surface having end recesses. To increase the sealing surface, i.e., the contact surface of the retention bead in the circumferential groove, this latter comprises a portion extending at right angles to the axis of symmetry of the tensioner, and the axial sealing surface bears against this portion even during the radial displacement of the retention bead.

Upon an occurrence of overpressure in the hydraulic tensioner, the configuration of the retention bead of the invention permits the bellows seal which bears against the piston housing to be displaced radially outwards and, to a limited extent, also the retention bead. The radial sealing surface thus becomes ineffective and the retention bead bears against the piston housing solely with its axial sealing surface. Due to the radial displacement, i.e., due to the inflated bellows seal, a reduction of pressure, i.e., a venting of the tensioner can take place through the end recesses in the axial sealing surface.

To achieve an improved venting, according to another feature of the invention, notches are provided in the circumferential groove of the piston housing in the region of the axial sealing surface to correspond to the recesses of the retention bead.

Advantageously, the bellows seal comprises regions of differing wall thicknesses so that the sealing region bearing against the piston housing can be displaced radially on occurrence of overpressure. According to the invention, the region of the bellows seal bearing with pre-stress against the outer housing of the tensioner has a larger wall thickness than the sealing region associated to the piston housing. This configuration permits the obtention of a desired, locally limited elasticity of sealing which promotes the action of the bellows seal of the invention.

According to another feature of the invention, to obtain a stiffening configuration, the inner surface of the bellows seal has an undulated profile with which adhesion can be improved and thereby also the sealing effect of the bellows seal on the outer housing.

Advantageously, the bellows seal is positionally fixed on the tensioner. It is particularly advantageous to effect a positioning between the bellows seal and the piston housing and thus assure a cooperation between the end recesses of the retention bead and the notches in the side wall of the circumferential groove during venting of the tensioner.

BRIEF DESCRIPTION OF THE DRAWINGS

For a further elucidation of the invention, reference is made to the drawings which show an example of embodiment of the invention in four figures.

DETAILED DESCRIPTION OF THE INVENTION

Figure 1:
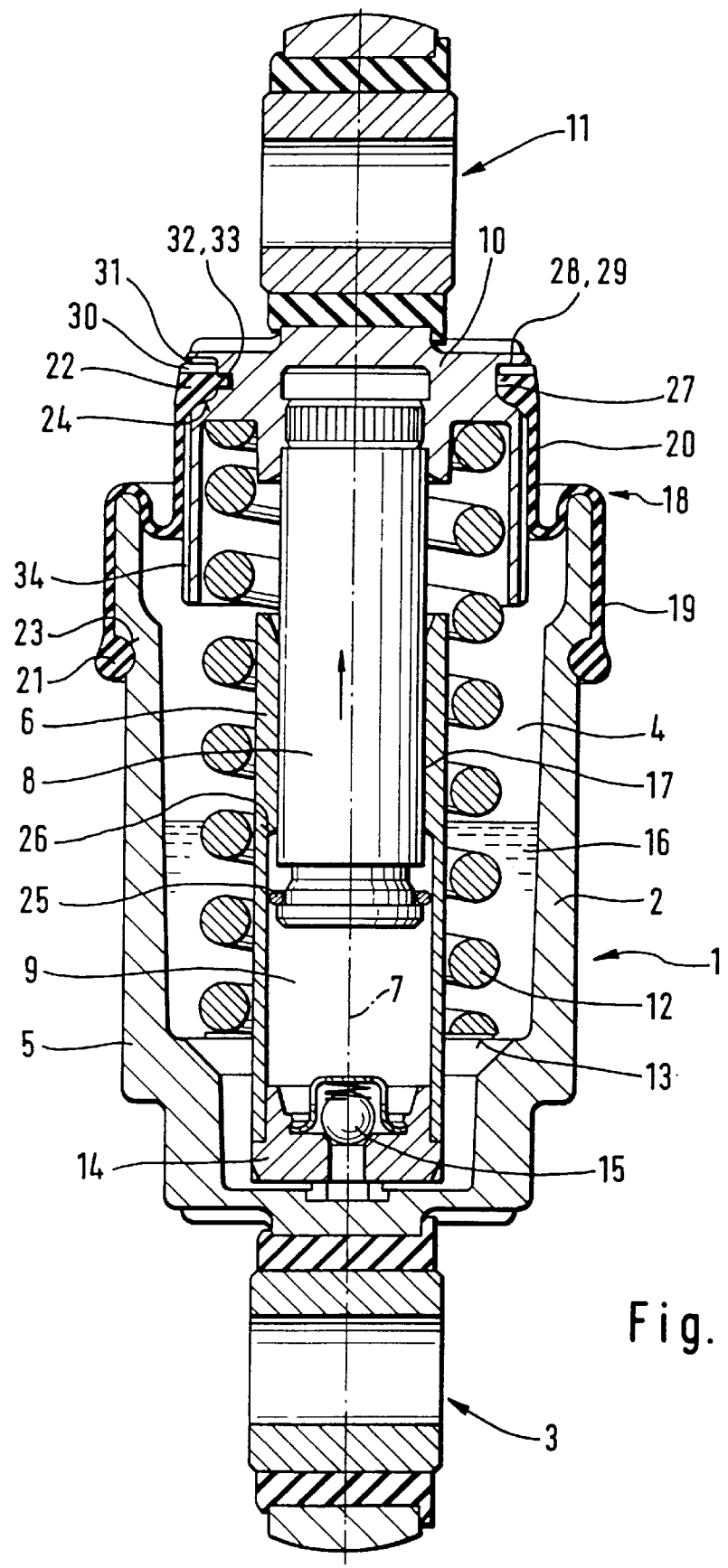
FIG. 1 is a longitudinal section of a hydraulic tensioner of the invention in a neutral position.

FIG. 1 shows a longitudinal section of a hydraulic tensioner 1 comprising a substantially rotationally symmetrical outer housing 2 with a fixing eye 3 on one end by which the hydraulic tensioner 1 can be fixed, for instance, on a crankcase of an internal combustion engine, not shown in FIG. 1. The outer housing has a generally hollow cylindrical configuration and comprises a cylindrical hollow space 4 in which a cylinder 6 is fixed in a central position radially spaced from an outer wall 5. A piston 8 slidable in the direction of an axis of symmetry 7 is arranged in the cylinder 6 and delimits a high pressure chamber 9 while being rigidly fixed on a piston housing 10. The piston housing 10 comprises a further fixing eye 11 which is connected directly or indirectly to a tension roller of a traction drive, not shown in FIG. 1. The fixing eye 11 can be linked, for example, to a lever which is pivoted at one end and whose free end bears through a tension roller against a traction drive. The piston housing 10 projects into the outer housing 2 radially spaced therefrom and serves to center a compression spring 12 which is supported at its opposite end on a bottom 13 of the outer housing 2 and effects a spreading of the components in the piston housing 10 and the outer housing 2, i.e. a displacement of the fixing eye 11 towards a position of a tension roller which increases the tension in the traction drive. On a movement of the piston 8 out of the cylinder 6 in the direction of the arrow, an exchange of hydraulic medium takes place through a one-way valve 15 arranged in the cylinder bottom 14 and permitting a flow of hydraulic medium out of a reservoir 16 situated in the hollow space 4. On a reversal of piston motion, hydraulic fluid flows out of the high pressure chamber 9 into the hollow space 4 through a leak gap 17 formed between the inner wall of the cylinder 6 and the peripheral surface of the piston 8 and thus fills the reservoir 16.

The partially telescoping components, i.e., the outer housing 2 and the piston housing 10 are sealed by a bellows seal 18 which bears under pre-stress with a radially outer portion 19 against the outer wall 5 of the outer housing 2 and is arranged with a radially inward stepped portion 20 on the piston housing 10. The two ends of the bellows seal 18 comprise a retention bead 21, 22 each, retained in an annular groove 23 of the outer housing 2 and in a circumferential groove 24 of the piston housing 10 respectively. By reason of the radial spacing between the piston housing 10 and the outer housing 2 and the configurataion of the bellows seal 18, i.e., its elasticity, the bellows seal 18 comes to bear in the form of a coil against the piston housing 10 and the outer housing 2 in the transition region between these components when the piston housing 10 is pushed into the outer housing 2. In this way, the bellows seal 18 assures an effective sealing irrespective of the position of the piston 8 and the piston housing 10.

Figure 2:
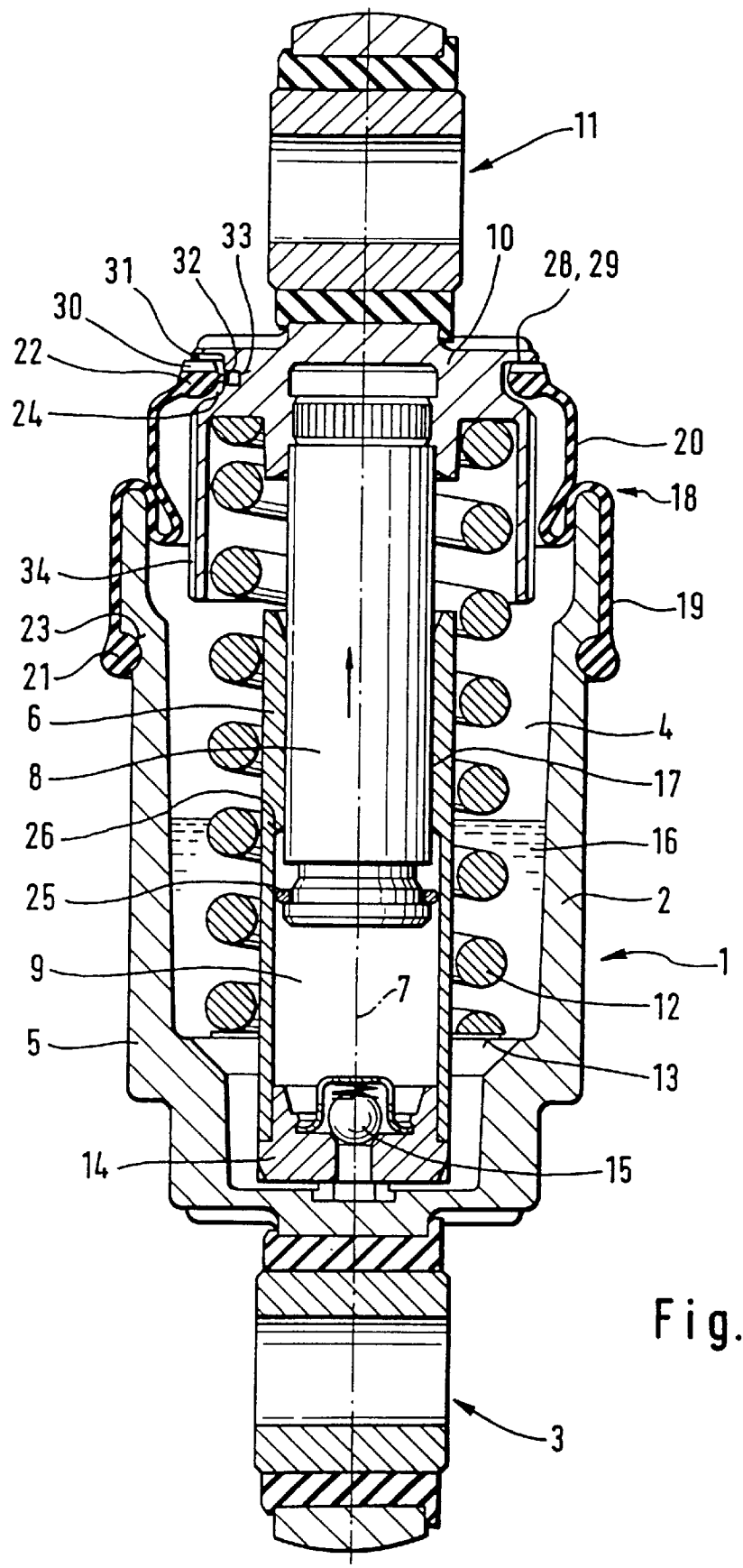
FIG. 2 shows the tensioner of FIG. 1 with the bellows seal in a venting position.

In contrast to FIG. 1, FIG. 2 shows the bellows seal 18 in a position which results during the formation of overpressure in the hydraulic tensioner 1. The structure and the arrangement of all the individual components of the hydraulic tensioner 1 are identical to those of the hydraulic tensioner 1 of FIG. 1 so that reference may be made for their description to the description of FIG. 1.

The bellows seal 18 takes the position shown in FIG. 2 when overpressure is developing in the hollow space 4 due to a larger stroke of the piston 8 in the direction opposed to the direction of the arrow. This occurs, for example, during a replacement of the toothed belt, when, because of being spring-loaded, the piston housing 10 displaces the piston 8 together with its associated clamping ring 25 up to a stop 26, and the piston 8 is then pressed into the cylinder 6 for mounting the belt. This inward movement causes an increase of pressure in the hollow space 4 leading to a radial displacement of the portion 20 of the bellows seal 18. The retention bead 22 is likewise affected by this radial displacement of the bellows seal 18 with the result that the sealing action of the radial sealing surface 27 is neutralized and the retention bead 22 bears against a side wall 29 of the circumferential groove 24 exclusively by the axial sealing surface 28. Due to end recesses in the retention bead 22, a controlled regulation of overpressure can take place in this position of the bellows seal in which the air enclosed in the hollow space 4 can escape at a pressure higher than atmospheric pressure. Due to its inherent elasticity and the pre-stress with which the bellows seal 18 or the portion 19 bears against the piston housing 10, the bellows seal 18 automatically regains its initial position shown in FIG. 1 after a reduction of pressure or regulation of overpressure. Advantageously, therefore, no air or pollutants can penetrate into the hydraulic tensioner 1 in its neutral position. In the same way, by reason of the described mode of operation of the bellows seal 18, a loss of oil which would impair the operation of the hydraulic tensioner 1 is prevented. To enhance the effectiveness of the recess 30 in the retention bead 21, the side wall 29 comprises notches 31 which are arranged to correspond to the recesses 30. To make the positions of the notches 31 and the recesses 30 coincide with each other, the portion 20 of the bellows seal 18 is positionally fixed on the piston housing 10. For this purpose, the retention bead 22 comprises at least one projection 32 which engages into an associated bore 33 in the piston housing 10. FIG. 2 further shows longitudinal grooves 34 which are arranged in a peripheral surface of the piston housing 10 to extend up to the circumferential groove 24. The circumferentially spaced longitudinal grooves 34 promote the pressure loading of the bellows seal 18 in the portion 19 so that this region can be substantially uniformly pressure-loaded when overpressure occurs and a desired, rapidly effective displacement takes place.

Figure 3:
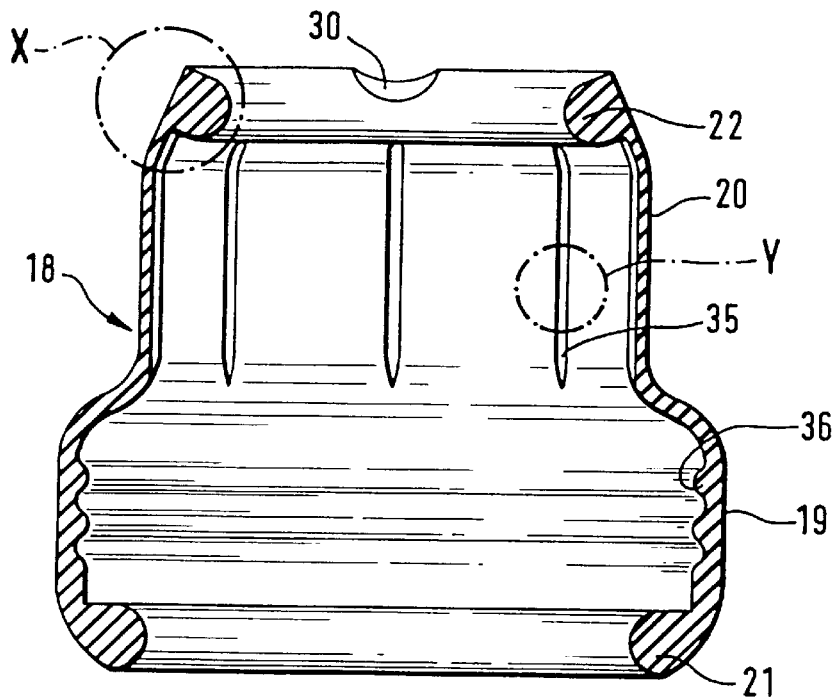
FIG. 3 is a unit drawing showing a sectional view of the bellows seal of the invention.

In FIG. 3, the bellows seal 18 is shown in a longitudinal section as an isolated part. Among other things, this drawing clearly shows the geometric configuration of the retention bead 21, 22 as also the different wall thicknesses of the portion 19 and the portion 20 of the bellows seal 18. To improve sealing and radial pre-stressing, the inner surface of the portion 19 is configured with an undulated profile 36. The portion 20, in contrast, comprises circumferentially spaced longitudinal grooves 35 which extend over the entire length of the portion 20 up to the retention bead 22. FIG. 3 further shows the generally semicircular recesses 30 on the end face of the retention bead 22 which, in the installed state, permit an exit of air from the hollow space 4 of the hydraulic tensioner 1 when overpressure occurs.

Figure 4:
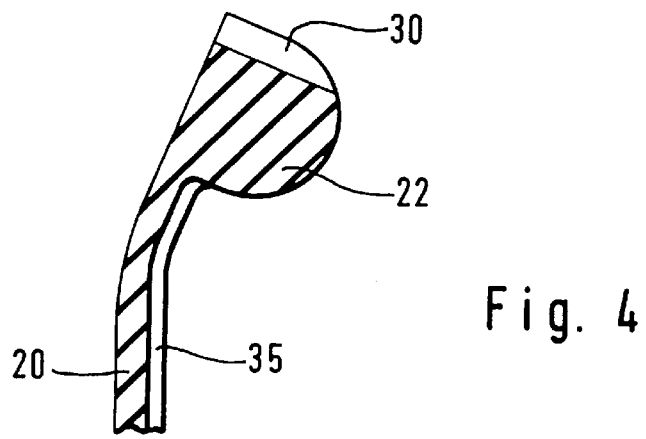
FIG. 4 shows the detail X of FIG. 3 on a larger scale.
Figure 5:
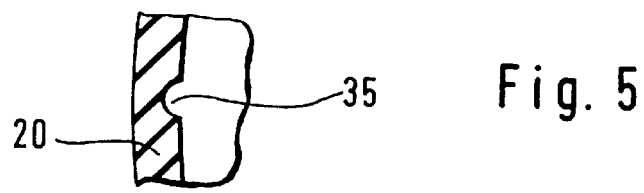
FIG. 5 is an enlarged representation of a detail Y of FIG. 3.

The detail X of FIG. 3, represented on an enlarged scale in FIG. 4, particularly shows the longitudinal extent of the recesses 30 and the arrangement of the longitudinal recess 35 on the portion 20 of the bellows seal 18. The enlarged representation of the detail Y of FIG. 3 in FIG. 5 shows the geometric cross-sectional shape of the longitudinal groove 35.

What is claimed is:

1. A hydraulic tensioner for a traction drive having one end pivotally supported and a further end connected directly or indirectly to a tension roller, the tensioner comprising a spring-loaded piston (8) guided for sliding motion in a cylinder (6) which is arranged in an outer housing (2) and filled with hydraulic medium to an amount corresponding to the piston position, in which tensioner, a piston motion causes an exchange of volume between a high pressure chamber (9) arranged in the cylinder (6) and a hollow space (4) of the outer housing (2) which is partly filled with hydraulic medium, and, depending on a direction of motion of the piston, said exchange of volume will take place through a one-way valve (15) arranged on the cylinder (6) or through a leak gap (17), the tensioner further comprising a bellows seal (18) which is connected to a piston housing (10) and the outer housing (2) and follows the longitudinal motion of the piston (8) while bearing under pre-stress against the outer housing (2) and against a radially inward stepped portion of the piston housing (10), both ends of the bellows seal (18) comprising a retention bead (21, 22) to assure a positional fixing on the outer housing (2) and the piston housing (10), the bellows seal (18), at least in an area of one of the retention beads (21, 22), includes a recess (30) which is located against one of the piston housing (10) and the outer housing (2) so that an overpressure developing in the hollow space (4) causes a radial displacement of a part of the bellows seal (18) and the recess provides a free communication between the hollow space (4) and the atmosphere.

2. A hydraulic tensioner of claim 1, wherein the radially inward stepped portion (20) of the bellows seal (18) associated to the piston housing (10) in an installed state of the hydraulic tensioner bears against the piston housing (10) by a partial surface.

3. A hydraulic tensioner of claim 2, wherein an inner surface of the bellows seal (18) comprises circumferentially spaced longitudinal grooves (35) which extend up to the retention bead (22).

4. A hydraulic tensioner of claim 1, wherein circumferentially spaced longitudinal grooves (34) extending up to a circumferential groove (24) are arranged on a peripheral surface of the piston housing (10).

5. A hydraulic tensioner of claim 1, wherein the tensioner (1) comprises longitudinal grooves (35) in the bellows seal (18) as well as longitudinal grooves (34) in the piston housing (10), and said longitudinal grooves (34, 35) are spaced circumferentially differently from one another.

6. A hydraulic tensioner of one of the claim 5, wherein the longitudinal grooves (34, 35) have a semicircular, a triangular or a similar geometric cross-sectional shape.

7. A hydraulic tensioner of claim 1, wherein, in a neutral position of the bellows seal (18), the retention bead (22) comprises a closed radial sealing surface (27) and an axial sealing surface (28) having end recesses (30) which act as the recess.

8. A hydraulic tensioner of claim 7, wherein an overpressure causes an outward radial displacement of the retention bead (22) which, in this position, bears sealingly against a side wall (29) of the circumferential groove (24) solely with the axial sealing surface (28).

9. A hydraulic tensioner of claim 1, wherein radial notches (31) are provided in the circumferential groove (24) of the piston housing (10) in the side wall (29) facing a fixing eye (11), which notches (31) correspond to the recesses (30) in the retention bead (21).

10. A hydraulic tensioner of claim 1, wherein a portion (20) of the bellows seal (18) associated to the piston housing (10) and a portion (19) of the bellows seal (18) bearing against the outer housing (2) have different wall thicknesses.

11. A hydraulic tensioner of claim 1, wherein an inner surface of the bellows seal (18) in the region of the outer housing (2) has an undulated profile (36).

12. A hydraulic tensioner of claim 1, wherein the retention bead (22) of the bellows seal (18) comprises at least one projection (32) which engages into a bore (33) of the piston housing (10) to prevent rotation of the bellows seal (18) on the piston housing (10).

* * * * *